United States Patent Office 3,256,264
Patented June 14, 1966

3,256,264
CATALYST FOR THE POLYMERIZATION OF MONOOLEFINS CONSISTING OF POWDERED ALUMINUM, THE HALIDE OF A METAL OF GROUPS IVa, Va, VIa OF THE PERIODIC TABLE, AND THE PRODUCT OF A REACTION MASS CONTAINING BENZENE, AlCl, AND A HALOGEN ACID
Heinrich Hopff, Kusnacht, Zurich, and Alexandre Solarsky, Zurich, Switzerland, assignors to Compagnie de Saint-Gobain, Neuilly-sur-Seine, France
No Drawing. Filed Aug. 2, 1961, Ser. No. 128,688
Claims priority, application France, Aug. 9, 1960, 835,389
9 Claims. (Cl. 260—94.9)

This invention relates to the polymerization of olefines. The term olefine as used herein includes compounds having at least one ethylenic double bond capable of being polymerized, and include the formula $C_nH_{2n}$. Olefines also include the olefine acids of the formula, $C_nH_{2n-1}COOH$, olefine alcohols of the formula $C_nH_{2n-1}OH$, and their simple substitution products in which nuclear H is replaced by groups such as halogen, nitro, alkyl. The invention is particularly related to the polymerization of low molecular weight members of the series, especially ethylene. The invention includes a novel catalyst for ethylenic polymerization, a novel process of making the catalyst, and a novel process of polymerization, using the catalyst. It also relates to a novel catalyst intermediate capable of storage until the period of use arrives, and ready transformation to the catalyst at the situs of use.

It is known to polymerize the lower olefins by means of catalysts prepared by the reaction of aluminum chloride and aluminum powder or olefines of low molecular weight. The former polymerizations are successful but are capable of improvement in efficiency, yield, and result.

It is an object of this invention to polymerize ethylene, the lower olefines, and their simple substitution products by means of new and more efficient procedures using novel catalysts, but without departing from the general outline of standard, useful techniques of polymerization.

Objects of the invention are accomplished, generally speaking, by a method of polymerizing ethylene which comprises heating ethylene at super atmospheric pressure in the presence of a catalyst including an acidified aluminum halide-aluminum powder complex with a hydrocarbon of the aromatic series which may have simple substituents of the type of alkyl, nitro, and halogen, and with a salt of a metal of groups IVa, Va, and VIa of the periodic table.

The applicants have discovered that one obtains very active catalysts for the polymerization of olefines, particularly ethylene, by preparing liquid complexes by the reaction of anhydrous aluminum chloride on aromatic hydrocarbons or their substitution products, this reaction being effectuated in the presence of gaseous halogenated hydracids, and by incorporating in these complexes aluminum powder and one or more metals of groups IVa, Va, and VIa before applying them to the polymerization of the olefines. Contrary to what occurs in the case of the former catalysts, which are already known and of which the complex includes the use of olefines of low molecular weight, one obtains by this invention a catalyst of regular and well defined composition.

The compounds which are useful for the preparation of catalysts according to this invention are of the benzene and naphthalene series, for instance benzene and its substitution products such as toluene, the xylenes, ethylbenzene, mesitylene, the halogenated benzene hydrocarbons such as o-dichlorobenzene and m-dichlorobenzene, and aromatic hydrocarbons of double ring structure such as tetraline and methylnaphthalene. Thus the hydrocarbons of the benzene and naphthalene series and their simple substitution products by alkyl, nitro, and halogen, are generally of some use.

The preparation of the catalysts according to the invention is novel and is carried out very simply by mixing aromatic hydrocarbons or their derivatives with anyhdrous aluminum chloride and saturating the mixture in an autoclave with halogenated hydracids in gas phase, hydrochloric acid gas being notably useful. In such conditions the anhydrous aluminum chloride goes entirely into solution and one obtains complex compositions of which the color ranges from yellow to brown. These combinations may be prepared with varying proportions of aluminum chloride to the aromatic compound, up to a molar proportion of about 1 to 1. These complexes are stable and may be stored indefinitely, being inert to everything except humidity, which can be excluded by the usual precautions.

By adding aluminum powder and halogenated metal of groups IVa, Va and VIa of the periodic table, such as titanium chloride, vanadium chloride, chromium chloride, molybdenum chloride, and hafnium chloride, one obtains compositions which are catalysts properly so called and which are excellent for the polymerization of lower olefines. The proportion of the components in these complexes may vary within large limits; a proportion by weight of aluminum chloride to aluminum powder between about 10 to 1 and about 1 to 1 is useful. Furthermore the molecular proportion of metal chloride to aluminum chloride may range from about 1 to 1 to 10 to 1.

The polymerization reaction is carried out in an autoclave under pressure by bringing the olefine of low molecular weight in contact with the catalyst until the absorption of the olefine ends. It is also possible to work in the following manner:

Mix the catalyst in a satisfactory proportion with indifferent organic diluents therefor such as, for instance, hexane, decane, cyclohexane, diethylcyclohexane, etc., before introducing the low molecular weight olefine under pressure, and thereafter introduce the said olefine into direct contact with the catalyst. The polymerization goes forward under these circumstances at room temperature, but it is advantageous to use a temperature between 20° C. and 100° C.; yet higher temperatures tend to produce some oily polymers of low molecular weight and are not generally necessary.

The pressure may also vary within large limits, for instance between 5 and 300 atmospheres. It is desirable to keep the pressure constant. When one works in the absence of a diluent the product polymerizes directly as a power of which the color varies from yellow to brown. The polymer may be produced in a purer state as a white powder by treating the polymer in the usual way by means of aqueous acid and alcohol, preferably in the presence of softening agents. The molecular weight of the product obtained is relative to the reaction temperature employed and can be varied within large limits, from approximately 10,000 to approximately 200,000.

The process can be operated batchwise or continuously. In the latter case one may advantageously use an apparatus of the type called boudineuse into which one introduces the monomer and the catalyst at one end of the tube and removes the polymer continually at the other end as a solid or a paste.

An important advantage of the invention resides in the fact that the catalyst is liquid and can thus be introduced into the reaction medium during the polymerization by means of a measuring pump. The following examples illustrate the invention without limiting the generalities of what has herein elsewhere been stated. As the invention is particularly used in the production of polyethylene the examples will be directed to that polymer.

*Example 1*

A mixture of 200 parts by weight of dry benzene and 100 parts by weight of anhydrous aluminum chloride are admitted to an autoclave at a pressure of 50 atmospheres and room temperature, and are saturated with dry HCl gas. The temperature is raised to 60° C. and kept there until the pressure falls. When the reduction of pressure has ended, which takes about 4 hours, the aluminum chloride has passed wholly into solution and the complex with benzene has been formed. This is stable and can be stored with the exclusion of humidity.

In a similar way one may prepare the corresponding complexes from p-xylene, o-dichlorobenzene, or nitrobenzene with anhydrous aluminum chloride and hydrochloric acid gas.

In using the intermediate thus prepared one may take 2.5 parts of that complex and mix it with 1.7 parts of titanium tetrachloride and 1.5 parts of aluminum powder and introduce it into an autoclave in the presence of ethylene under 35 atmospheres at a temperature of 60° C. for a time sufficient to complete the absorption of the ethylene. A solid polymer is produced which can be changed to a white powder by heating with methanol and hydrochloric acid. The yield is practically quantitative. The product has a fusion point of 125° C. and molecular weight of 52,000. The density is .95 and the ash content is less than .1%. The product is strongly crystalline and can be worked by molding under pressure or by injection to produce objects of any shape.

*Example 2*

Heat in the presence of ethylene at 60° C. in an autoclave under 60 atmospheres pressure until the absorption of ethylene ceases a mixture of 40 parts of the benzene complex of Example 1 with .4 part of titanium chloride and .3 part of aluminum powder and proceed as in Example 1. The product is obtained in a yield which is practically quantitative, and is a polymer having a fusion point of 126/127° C. and a density of .952.

*Example 3*

In the presence of ethylene under 50 atmospheres pressure for 6 hours at 70° C. there were heated together 5 parts of the benzene complex described in Example 1, 1.7 parts of titanium chloride, .9 part of aluminum powder and 170 parts of dry normal heptane as an indifferent organic solvent or diluent. The mass obtained is viscous and is treated with 250 parts methanol and 60 parts concentrated hydrochloric acid, producing a strong discoloration which gradually disappears and becomes white. The precipitate obtained is dried at 80° C. after washing with water. The yield was above 80% of that which is theoretically possible. The product fused at 123/124° C. and had a density of .948.

*Example 4*

Into a jacketed stainless steel autoclave provided with an agitator and having capacity of 4 liters were successively introduced 1.5 liters of anhydrous hexane, 3 grams of powdered aluminum, 50 cc. of a complex as described in the specification and 17 grams of titanium tetrachloride.

The complex was prepared by reacting one mole of aluminum chloride with 3 moles of anhydrous ethylbenzene in the presence of hydrochloric gas.

This complex comprised one molecule each of the two constituents dissolved in two molecules of ethylbenzene.

The autoclave was then closed, heated at 60° C. under agitation and ethylene was then introduced under 10 kg pressure.

Polymerization started almost at once. After 250 grams of polyethylene had formed in 1½ hours, ethylene was replaced by propylene while the pressure was kept at 10 kg. Polymerization proceeded during two more hours and 250 grams of propylene was copolymerized. The product formed was easily purified by the ordinary method, the metallic salts being hydrolyzed at elevated temperature by addition of alcohol in the presence of water.

The advantages of the invention are in the attainment of the objects of the invention, and in the process itself, which is more efficient than prior art processes using the aluminum catalysts of the prior art. The process is very flexible and produces a great range of products.

As many apparently widely different embodiments of the present invention may be made without departing from the spirit and scope thereof, it is to be understood that the invention is not limited to the specific embodiments.

What is claimed is:

1. A method of making a catalyst for the polymerization of monoolefines which comprises mixing the product of a reaction mass containing benzene, $AlCl_3$, and a halogen acid, which a halogenated metal of groups IVa, Va, or VIa of the periodic table, and with powdered aluminum.

2. A catalyst according to claim 3 in which the halides are chlorides.

3. A catalyst adapted to the polymerization of monoolefines which has as essential ingredients powdered aluminum, the halide of a metal of groups IVa, Va, or VIa of the periodic table, and the product of a reaction mass containing benzene, $AlCl_3$, and a halogen acid.

4. A method of polymerizing a monoolefine which comprises contacting the monomer under conditions of temperature and pressure favorable to polymerization with a catalyst complex being the reaction product of benzene, $AlCl_3$, and a halogen acid, with powdered aluminum, and the chloride of a metal of groups IVa, Va, and VIa of the periodic table until substantial polymerization has occurred, and isolating the polymer.

5. A method of polymerizing a monoolefine, which comprises mixing a catalyst complex of benzene, aluminum chloride, and a halogen acid with powdered aluminum, and halide of a metal of groups IVa, Va, and VIa of the periodic table, with a solvent, and contacting the olefinic compound therewith at superatmospheric pressure, and at a temperature between about 50° and 100° C.

6. A method of polymerizing ethylene which comprises putting in an autoclave 2.5 parts by weight of a complex formed by the reaction of benzene, aluminum chloride, and HCl, 1.7 parts of $TiCl_4$, 1.5 parts of aluminum powder, and ethylene at 35 atmospheres pressure, heating the reaction mass at about 60° C. until substantial polymerization has occurred, and isolating the polymer at atmospheric pressure.

7. A method of polymerizing ethylene which comprises heating ethylene at about 60° C. at about 60 atmospheres pressure in the presence of a catalyst comprised of the reaction product of benzene, aluminum chloride and hydrochloric acid, powdered aluminum and $TiCl_4$, until substantial polymerization has occurred, and isolating the polymer at atmospheric pressure.

8. A method of polymerizing ethylene which comprises heating ethylene at about 70° C. at about 50 atmospheres pressure in the presence of the reaction product of benzene, $AlCl_3$, and HCl, powdered aluminum, $TiCl_4$, and heptane until substantial polymerization has occurred, and isolating the polymer at atmospheric pressure.

9. A method of polymerizing ethylene which comprises heating ethylene at superatmospheric pressure in the presence of a catalyst including a complex being the reaction product of a halogen acid, aluminum chloride, and benzene or its substitution products bearing at least one of the group consisting of alkyl, halogen, and nitro, with aluminum metal, and a halide of a metal of groups IVa, Va, and VIa of the periodic table.

References Cited by the Examiner

UNITED STATES PATENTS

| | | | |
|---|---|---|---|
| 2,733,219 | 1/1956 | Bloch | 252—442 |
| 3,008,946 | 11/1961 | Rhodes et al. | 260—94.9 |
| 3,047,514 | 7/1962 | Burk et al. | 252—442 |
| 3,057,841 | 10/1962 | Raum | 260—94.9 |
| 3,057,843 | 10/1962 | Farhat et al. | 260—94.9 |
| 3,080,354 | 3/1963 | Moon | 260—94.9 |

FOREIGN PATENTS 533,362   5/1955   Belgium.

OTHER REFERENCES

Norris et al.: J. Am. Chem. Soc. 62, 1428–32 (1940).

Thomas: "Anhydrous Aluminum Chloride," pages 48 and 59, Reinhold, 1941.

Gaylord: "Linear and Stereoregular Addition Polymers," pp.321 and 322, Interscience, 1959.

JOSEPH L. SCHOFER, *Primary Examiner.*